(12) United States Patent
Baek

(10) Patent No.: US 12,555,833 B2
(45) Date of Patent: Feb. 17, 2026

(54) APPARATUS FOR DIAGNOSING ABNORMALITY OF A BATTERY CELL GROUP AND METHOD FOR THE SAME

(71) Applicants: HYUNDAI MOTOR COMPANY, Seoul (KR); Kia Corporation, Seoul (KR)

(72) Inventor: Yo Han Baek, Anyang-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 136 days.

(21) Appl. No.: 18/388,925

(22) Filed: Nov. 13, 2023

(65) Prior Publication Data

US 2025/0030066 A1 Jan. 23, 2025

(30) Foreign Application Priority Data

Jul. 17, 2023 (KR) .................. 10-2023-0092620

(51) Int. Cl.
*H01M 10/42* (2006.01)
*G01R 31/36* (2020.01)
*G01R 31/3835* (2019.01)
*G01R 31/396* (2019.01)
*H01M 10/48* (2006.01)
*H01M 50/512* (2021.01)

(52) U.S. Cl.
CPC .... *H01M 10/4285* (2013.01); *G01R 31/3648* (2013.01); *G01R 31/3835* (2019.01); *G01R 31/396* (2019.01); *H01M 10/482* (2013.01); *H01M 50/512* (2021.01)

(58) Field of Classification Search
CPC ........... H01M 10/4285; H01M 10/482; H01M 50/512; G01R 31/3648; G01R 31/3835; G01R 31/396; G01R 31/392; G01R 19/003; G01R 19/16528; G01R 19/16576; G01R 19/1659; G01R 31/374; G01R 31/385; Y02E 60/10
See application file for complete search history.

(56) References Cited

U.S. PATENT DOCUMENTS

2022/0140617 A1* 5/2022 Wang .................. G01R 31/396
 320/134
2024/0133972 A1* 4/2024 Sung ..................... B60L 3/0046

\* cited by examiner

*Primary Examiner* — Daryl C Pope
(74) *Attorney, Agent, or Firm* — MORGAN, LEWIS & BOCKIUS LLP

(57) ABSTRACT

An apparatus for diagnosing abnormality of a battery cell group and a method for the same are provided. The apparatus includes a voltage sensor to measure a voltage value with respect to each battery cell group including a plurality of battery cells connected to each other in parallel, and a controller to determine an accumulated voltage value for an effective time with respect to each battery cell group, determine a representative value for each battery cell group by removing an offset from each accumulated voltage value, and detect a battery cell group having abnormality, based on an average value and a standard deviation of representative values.

20 Claims, 6 Drawing Sheets

APPARATUS FOR DIAGNOSING ABNORMALITY OF A BATTERY CELL GROUP AND METHOD FOR THE SAME

CROSS-REFERENCE TO RELATED APPLICATION

The present application claims priority to Korean Patent Application No. 10-2023-0092620, filed on Jul. 17, 2023, the entire contents of which is incorporated herein for all purposes by this reference.

BACKGROUND OF THE PRESENT DISCLOSURE

Field of the Present Disclosure

The present disclosure relates to a technology of detecting a battery cell group, which has abnormality, of groups (hereinafter, battery cell groups) in which a plurality of battery cells are connected to each other in parallel.

Description of Related Art

In general, a battery used in an energy storage system (ESS) and an electric vehicle (EV) have a structure in which a plurality of battery cells connected to each other in parallel form the preset number of groups to increase a current capacity, and the groups are connected to each other in series to output a rated voltage. In the instant case, the battery cell, which includes a cathode current collector, an anode current collector, a separator, an active material, and an electrolyte, may be repeatedly charged and discharged through an electrochemical reaction between components.

The internal resistance of the battery cell may increase due to defect, degradation, vibration, and impact. When the internal resistance of some battery cells in the battery cell group increases, the charging amount and discharging amount of the remaining battery cells relatively increase, and the intensity of a charging current and the intensity of a discharging current relatively increase, thereby accelerating the degradation.

Because one battery cell group includes 200 to 400 battery cells, it is practically difficult to mount a voltage sensor for each battery cell. Even if the voltage sensor is mounted for each battery cell, each battery cell group generally includes one voltage sensor, because the synthetic voltage is measured due to the structure of the parallel connection. The voltage sensor merely measures the voltage of the battery cell group, but may not measure the voltage of each battery cell in the battery cell group.

Accordingly, because a battery cell group including a battery cell (i.e., a battery cell in which an abnormality occurs) having increased internal resistance of the plurality of battery cell groups may not be detected, the manner for detecting the battery cell group having the increased internal resistance is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus for diagnosing the abnormality of a battery cell group, configured for measuring a voltage with respect to each battery cell group including a plurality of battery cells connected to each other in parallel, of determining an accumulated value (accumulated voltage value) of a voltage for an effective time in each battery cell group, of determining a representative value for each battery cell group by removing an offset from each accumulated voltage value, and of detecting a battery cell group having abnormality, based on an average value and a standard deviation of the representative values, diagnosing the abnormality of each battery cell group with higher accuracy, with respect to battery cell groups in which a plurality of battery cells are connected to each other in parallel, and a method for the same.

Another aspect of the present disclosure provides an apparatus for diagnosing the abnormality of a battery cell group, configured for measuring a voltage with respect to each battery cell group in which a plurality of battery cells are connected to each other in parallel, of determining a corrected voltage for each battery cell group by removing an offset from the voltage, of determining an accumulated value of the corrected voltage for the effective time with respect to each battery cell group, based on the corrected voltage, and of detecting a battery cell group having abnormality, based on the average value and the standard deviation of accumulated values of the corrected voltage, diagnosing the abnormality of each battery cell group with higher accuracy, with respect to battery cell groups in which a plurality of battery cells are connected to each other in parallel, and a method for the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for diagnosing abnormality of a battery cell group may include a voltage sensor to measure a voltage value with respect to each battery cell group including a plurality of battery cells connected to each other in parallel, and a controller to determine an accumulated voltage value for an effective time with respect to each battery cell group, determine a representative value for each battery cell group by removing an offset from each accumulated voltage value, and detect a battery cell group having abnormality, based on an average value and a standard deviation of representative values.

According to an exemplary embodiment of the present disclosure, the controller may determine, as the effective time, a time period before and after charging of the battery cell group is terminated.

According to an exemplary embodiment of the present disclosure, the controller may sort voltages for the effective time in descending order with respect to each battery cell group, and exclude a predetermined number of voltages from a highest voltage value with respect to each battery cell group.

According to an exemplary embodiment of the present disclosure, the controller may be configured to determine an offset for each battery cell group by multiplying a minimum voltage value for each battery cell group by the effective time, and subtract the offset from the accumulated voltage value for each battery cell group.

According to an exemplary embodiment of the present disclosure, the controller may be configured to determine a threshold range by use of the average value and the standard deviation, and diagnose, as the battery cell group having the abnormality, a battery cell group corresponding to a representative value, which is out of the threshold range, from among representative values of each battery cell group.

According to another aspect of the present disclosure, a method for diagnosing abnormality of a battery cell group, may include measuring a voltage value with respect to each battery cell group including a plurality of battery cells connected to each other in parallel, determining, by a controller, an accumulated voltage value for an effective time with respect to each battery cell group, determining, by the controller, a representative value for each battery cell group by removing an offset from each accumulated voltage value, and detecting, by the controller, a battery cell group having abnormality, based on an average value and a standard deviation of representative values.

According to an exemplary embodiment of the present disclosure, the determining of the accumulated voltage value may include determining, by the controller, as the effective time, a time period before and after charging of the battery cell group is terminated.

According to an exemplary embodiment of the present disclosure, the determining of the accumulated voltage value may include sorting, by the controller, voltages for the effective time in descending order with respect to each battery cell group, and excluding, by the controller, a predetermined number of voltages from a highest voltage value with respect to each battery cell group.

According to an exemplary embodiment of the present disclosure, the determining of the representative value for each battery cell group may include determining, by the controller, an offset for each battery cell group by multiplying a minimum voltage value for each battery cell group by the effective time, and subtracting, by the controller, the offset from an accumulated voltage value for each battery cell group.

According to an exemplary embodiment of the present disclosure, the detecting of the battery cell group having the abnormality may include determining, by the controller, a threshold range by use of the average value and the standard deviation, and diagnosing, by the controller, as the battery cell group having the abnormality, a battery cell group corresponding to a representative value, which is out of the threshold range, from among representative values of each battery cell group.

According to another of the present disclosure, an apparatus for diagnosing abnormality of a battery cell group may include a voltage sensor to measure a voltage value with respect to each battery cell group including a plurality of battery cells connected to each other in parallel, and a controller to determine a corrected voltage for each battery cell group by removing an offset from the voltage value, determine a corrected-voltage accumulated value for an effective time with respect to each battery cell group, based on the corrected voltage, and detect a battery cell group having abnormality, based on an average value and a standard deviation of the corrected-voltage accumulated value.

According to an exemplary embodiment of the present disclosure, the controller may determine, as an offset for each battery cell group, the minimum voltage value for the battery cell group from among voltage values for each battery cell group measured for the effective time, and subtract the offset from voltage values for each battery cell group.

According to an exemplary embodiment of the present disclosure, the controller may determine, as the effective time, a time period before and after charging of the battery cell group is terminated.

According to an exemplary embodiment of the present disclosure, the controller may sort voltages for the effective time in descending order with respect to each battery cell group, and exclude a predetermined number of voltages from a highest voltage value with respect to each battery cell group.

According to an exemplary embodiment of the present disclosure, the controller may be configured to determine a threshold range by use of the average value and the standard deviation, and diagnose, as the battery cell group having the abnormality, a battery cell group corresponding to a corrected-voltage accumulated value, which is out of the threshold range, from among corrected-voltage accumulated values of each battery cell group.

According to another aspect of the present disclosure, a method for diagnosing abnormality of a battery cell group, may include measuring, by a voltage sensor, a voltage value with respect to each battery cell group including a plurality of battery cells connected to each other in parallel, determining, by a controller, a corrected voltage for each battery cell group by removing an offset from the voltage value, determining, by the controller, a corrected-voltage accumulated value for an effective time with respect to each battery cell group, based on the corrected voltage, and detecting, by the controller, a battery cell group having the abnormality, based on an average value and a standard deviation of the corrected-voltage accumulated value.

According to an exemplary embodiment of the present disclosure, the determining of the corrected voltage for each battery cell group may include determining, by the controller, as an offset for each battery cell group, the minimum voltage value for the battery cell group from among voltage values for each battery cell group measured for the effective time, and subtracting, by the controller, the offset from voltages for each battery cell group.

According to an exemplary embodiment of the present disclosure, the determining of the accumulated voltage value may include determining, by the controller, as the effective time, a time period before and after charging of the battery cell group is terminated.

According to an exemplary embodiment of the present disclosure, the determining of the accumulated voltage value may include sorting, by the controller, voltages for the effective time in descending order with respect to each battery cell group, and excluding, by the controller, a predetermined number of voltages from a highest voltage value with respect to each battery cell group.

According to an exemplary embodiment of the present disclosure, the detecting of the battery cell group having the abnormality may include determining, by the controller, a threshold range by use of the average value and the standard deviation, and diagnosing, by the controller, as the battery cell group having the abnormality, a battery cell group corresponding to a corrected-voltage accumulated value, which is out of the threshold range, from among corrected-voltage accumulated values of each battery cell group.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
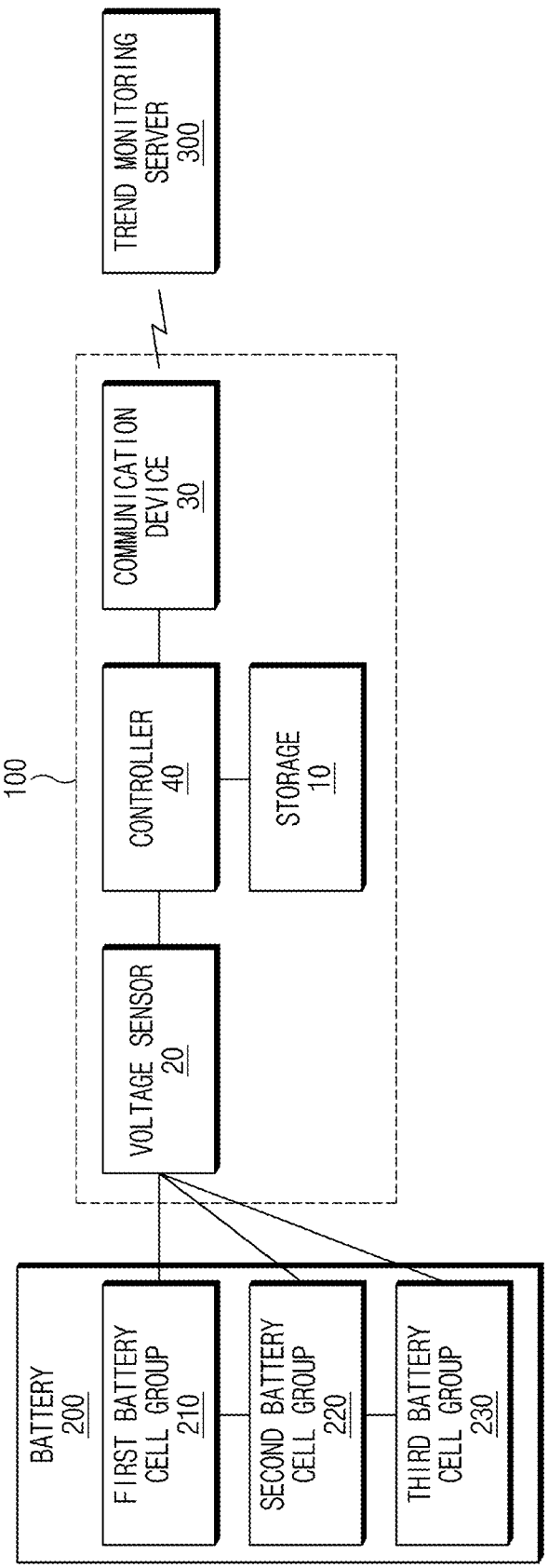
FIG. 1 is a block diagram illustrating an apparatus for diagnosing the abnormality of a battery cell group, according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to accompanying drawings. In adding the reference numerals to the components of each drawing, it should be noted that the identical or equivalent component is designated by the identical numeral even when they are displayed on other drawings. Furthermore, in the following description of an exemplary embodiment of the present disclosure, a detailed description of well-known features or functions will be ruled out in order not to unnecessarily obscure the gist of the present disclosure. In describing the components of the exemplary embodiment of the present disclosure, terms such as first, second, "A", "B", "(a)", "(b)", and the like may be used. These terms are merely intended to distinguish one component from another component, and the terms do not limit the nature, sequence or order of the constituent components. Furthermore, unless otherwise defined, all terms used herein, including technical or scientific terms, include the same meanings as those generally understood by those skilled in the art to which the present disclosure pertains. Such terms as those defined in a generally used dictionary are to be interpreted as including meanings equal to the contextual meanings in the relevant field of art, and are not to be interpreted as including ideal or excessively formal meanings unless clearly defined as including such in the present application.

FIG. 1 is a flowchart illustrating a method for diagnosing the abnormality of a battery cell group according to an exemplary embodiment of the present disclosure.

As illustrated in FIG. 1, according to an exemplary embodiment of the present disclosure, an apparatus 100 for diagnosing the abnormality of a battery cell group may include a storage 10, a voltage sensor 20, a communication device 30, and a controller 40. In the instant case, depending on a scheme of implementing the apparatus 100 for diagnosing the abnormality of a battery cell group according to an exemplary embodiment of the present disclosure, components may be combined with each other to be implemented as one, or some components may be omitted. Furthermore, although a battery 200 includes a first battery cell group 210, a second battery cell group 220, and a third battery cell group 230 in the following description, the present disclosure is not limited to the number of battery cell groups, but varied depending on the selection of a designer.

Regarding each of the components, the storage 10 may store various logics, various algorithms, and various programs required in a process of measuring a voltage with respect to each battery cell group including a plurality of battery cells connected to each other in parallel, of determining an accumulated value (accumulated voltage value) of a voltage for an effective time in each battery cell group, of determining a representative value for each battery cell group by removing an offset from each accumulated voltage value, and of detecting a battery cell group having abnormality, based on an average value and standard deviation of the representative values.

In detail, the storage 10 may store various logics, various algorithms, and various programs required in a process of measuring the voltage of the first battery cell group 210, determining a first accumulated voltage value with respect to the first battery cell group 210 for an effective time, of determining a first representative value by removing a first offset from the first accumulated voltage value, of measuring a voltage of a second battery cell group 220, determine a second accumulated voltage value with respect to the second battery cell group 220 for the effective time, of determining a second representative value by removing a second offset from the second accumulated voltage value, of measuring the voltage of a third battery cell group 230, of determining a third accumulated voltage value with respect to the third battery cell group 230 for the effective time, of determining a third representative value by removing a third offset from the third accumulated voltage value, and of detecting a battery cell group having abnormality based on the average value and the standard deviation of the first representative value, the second representative value, and the third representative value.

Furthermore, the storage 10 may store various logics, various algorithms, and various programs required in a process of measuring a voltage value with respect to each battery cell group in which a plurality of battery cells are connected to each other in parallel, of determining a corrected voltage for each battery cell group by removing an offset from the voltage, of determining an accumulated value of the corrected voltage with respect to each battery cell group for the effective time, based on the corrected voltage, and of detecting a battery cell group having abnormality, based on the average value and the standard deviation of accumulated values of the corrected voltage.

In detail, the storage 10 may store various logics, various algorithms, and various programs required in a process of periodically measuring the voltage of the first battery cell group 210, of determining a corrected voltage of the first battery cell group 210 by removing a first offset from the voltage, of determining a first corrected-voltage accumulated value with respect to the first battery cell group 210 based on the corrected voltage, of periodically measuring the voltage of a second battery cell group 220, of determining a corrected voltage of the second battery cell group 220 by removing a second offset from the voltage, of determining a second corrected-voltage accumulated value for the effective time, based on the corrected voltage of the second battery cell group 220, of periodically measuring the voltage of the third battery cell group 230, of determining a corrected voltage of the third battery cell group 230 by removing a third offset from the voltage, of determining a third corrected-voltage accumulated value for the effective time, based on the corrected voltage of the third battery cell group 230, and of detecting a battery cell group having abnormality, based on the average value and the standard deviation of the first corrected-voltage accumulated value, the second corrected-voltage accumulated value, and the third corrected-voltage accumulated value.

The voltage sensor 20 may measure a voltage with respect to each battery cell group in which a plurality of battery cells are connected to each other in parallel. For example, the voltage sensor 20 may include a first voltage sensor to measure a voltage of the first battery cell group 210, a second voltage sensor to measure the second battery cell group 220, and the third voltage sensor to measure a voltage of the battery cell group 230.

The communication device 30, which is a module to provide a communication interface with a trend monitoring server 300, may include at least one of a mobile communication module, a wireless Internet module, or a short-range communication module.

The mobile communication module may make communication with the trend server 300 over a mobile communication network constructed depending on technology standards or communication schemes for mobile communication. For example, the technology standards or communication schemes for mobile communication may include Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), or Long Term Evolution-Advanced (LTEA).

The wireless Internet module, which is a module for wireless Internet access, may make communication with the trend server 300 through Wireless LAN (WLAN), Wireless-Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), or Long Term Evolution-Advanced (LTE-A).

The short-range communication module may support short-range communication with the trend monitoring server 300 through at least one of Bluetooth™, Radio Frequency Identification (RFID), Infrared Data Association (IrDA), Ultra Wideband (UWB), ZigBee, Near Field Communication (NFC), or Wireless Universal Serial Bus (USB).

The controller 40 may perform the overall control so that the components normally perform the respective functions. Furthermore, the controller 40 may be implemented in a form of hardware or software, and may be implemented in a form of the combination of the hardware and the software. The controller 40 may be implemented with a microprocessor, but the present disclosure is not limited thereto.

The controller 40 may measure a voltage with respect to each battery cell group including a plurality of battery cells connected to each other in parallel, determine an accumulated value (accumulated voltage value) of a voltage for an effective time with respect to each battery cell group, determine a representative value for each battery cell group by removing an offset from each accumulated voltage value, and detect a battery cell group having abnormality, based on an average value and standard deviation of the representative values.

In detail, the storage 40 may measure the voltage of the first battery cell group 210, determine a first accumulated voltage value for an effective time with respect to the first battery cell group 210, determine a first representative value by removing a first offset from the first accumulated voltage value, measure a voltage of a second battery cell group 220, determine a second accumulated voltage value with respect to the second battery cell group 220 for the effective time, determine a second representative value by removing a second offset from the second accumulated voltage value, measure the voltage of a third battery cell group 230, determine a third accumulated voltage value with respect to the third battery cell group 230 for the effective time, determine a third representative value by removing a third offset from the third accumulated voltage value, and detect a battery cell group having abnormality based on the average value and the standard deviation of the first representative value, the second representative value, and the third representative value.

Furthermore, the storage 10 may measure a voltage with respect to each battery cell group in which a plurality of battery cells are connected to each other in parallel, determine a corrected voltage for each battery cell group by removing an offset from the voltage, determine a corrected-voltage accumulated value with respect to each battery cell group for the effective time, based on the corrected voltage, and detect a battery cell group having abnormality, based on the average value and the standard deviation of accumulated values of the corrected voltage.

In detail, the controller 40 may periodically measure the voltage of the first battery cell group 210, determine a corrected voltage of the first battery cell group 210 by removing a first offset from each voltage, determine the first corrected-voltage accumulated value for the effective time based on the corrected voltage of the first battery cell group 210, periodically measure the voltage of a second battery cell group 220, determine a corrected voltage of the second battery cell group 220 by removing a second offset from the voltage, determine the second corrected-voltage accumulated value for the effective time, based on the corrected voltage of the second battery cell group 220, periodically measure the voltage of the third battery cell group 230, determine the corrected voltage of the third battery cell group by removing a third offset from the voltage, determine a third corrected-voltage accumulated value for the effective time, based on the corrected voltage of the third battery cell group 230, and detect a battery cell group having abnormality, based on the average value and the standard deviation of the first corrected-voltage accumulated value, the second corrected-voltage accumulated value, and the third corrected-voltage accumulated value.

Hereinafter, the operation of the controller 40 will be described in detail with reference to FIG. 2, FIG. 3, FIG. 4 and FIG. 5.

Figure 2:
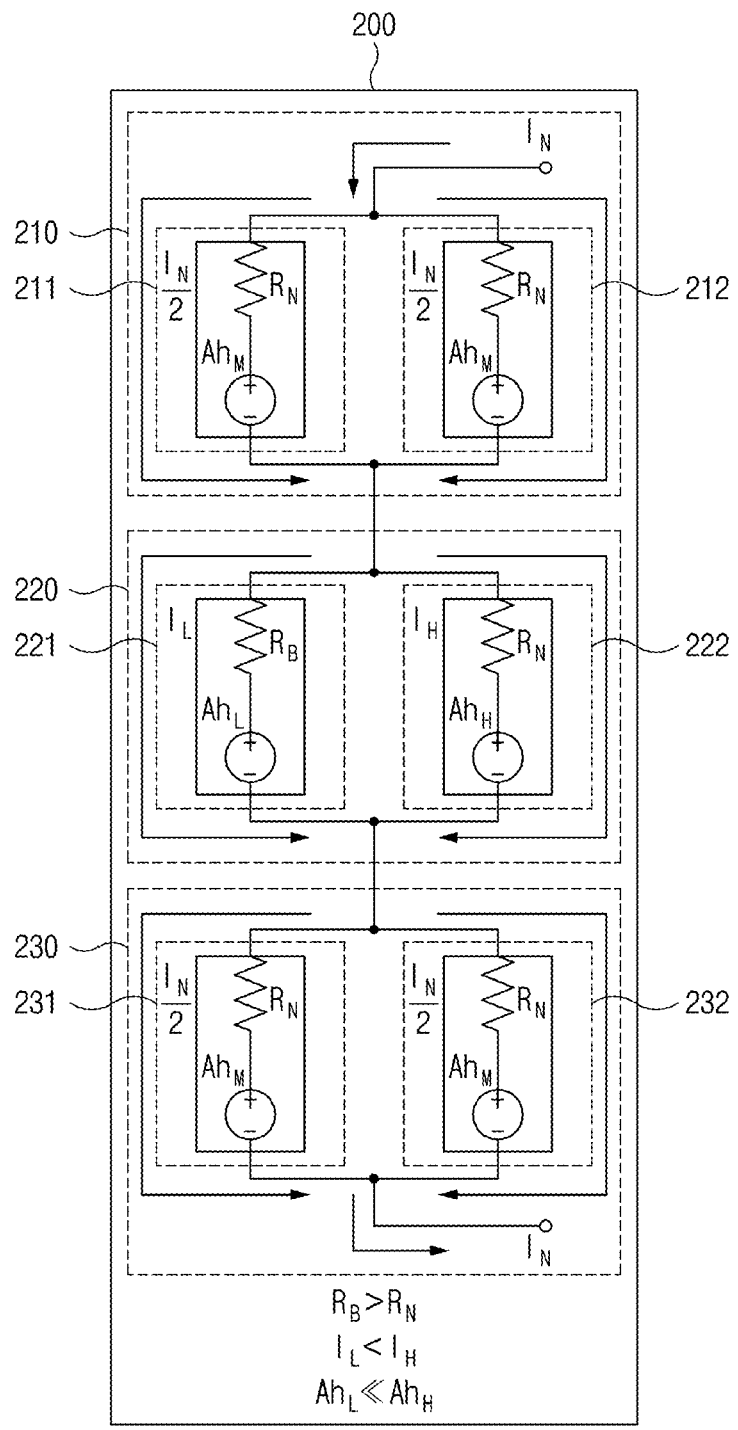
FIG. 2 is a view exemplarily illustrating the structure of a battery cell group in which a plurality of battery cells are connected to each other in parallel, according to an exemplary embodiment of the present disclosure.

FIG. 2 is a view exemplarily illustrating the structure of a battery cell group in which a plurality of battery cells are connected to each other in parallel, according to an exemplary embodiment of the present disclosure.

As illustrated in FIG. 2, the battery 200 includes the first battery cell group 210, the second battery cell group 220, and the third battery cell group 230. The first battery cell group 210 includes a first battery cell 211 and a second battery cell 212 connected to each other in parallel, the second battery cell group 220 includes a first battery cell 221 and a second battery cell 222 connected to each other in parallel, and a third battery cell group 230 includes a first battery cell 213 and a second battery cell 232 connected to each other in parallel. In the instant case, although two battery cells are connected to each other in parallel for the illustrative purpose, the present disclosure is not limited thereto. The number of batteries may be increased depending on the intent of a designer.

Furthermore, the first battery cell 211 and the second battery cell 212 have the same resistance ($R_N$) forming the first battery cell group 210. Accordingly, the same current ($^IN/2$) may flow through the first battery cell 211 and the second battery cell 212. Similarly, because the first battery cell 231 and the second battery cell 232 forming the third battery cell group 230 have the same resistance ($R_N$), the same current ($^IN/2$) may flow through the first battery cell 231 and the second battery cell 232. Furthermore, an accumulated current amount ($Ah_M$) of the first battery cell 211 forming the first battery cell group 210 is equal to an accumulated current amount ($Ah_M$) of the second battery cell 212. The accumulated current amount ($Ah_M$) of the first battery cell 231 forming the third battery cell group 230 is equal to an accumulated current amount ($Ah_M$) of the second battery cell 232.

However, the first battery cell 221 forming the second battery cell group 220 has a resistance ($R_B$), while the second battery cell 222 includes a resistance ($R_N$). In the instant case, although the internal resistance of the first battery cell 221 was first $R_N$, the internal resistance is increased ($R_B>R_N$) due to the defect, the deterioration, the vibration, and the impact, and becomes $R_B$ (that is, the second battery cell group 220 is a battery cell group having abnormality. Accordingly, the current ($I_L$) flowing through the first battery cell 221 and the current ($I_H$) flowing through the second battery cell 222 are different from each other in intensity ($I_L<I_H$). The current intensity causes the difference ($Ah_L<<Ah_H$) between the accumulated current amount ($Ah_H$) of the first battery cell 221 and the accumulated current amount ($Ah_H$) of the second battery 222. The difference between the accumulated current amounts is maximized right before the charging of the battery 200 is terminated. For reference, the relationship between the accumulated current amounts satisfies $Ah_L<Ah_M<Ah_H$.

The internal resistance of the first battery cell 211 forming the first battery cell group 210 is equal to the internal resistance of the second battery cell 212. Furthermore, the internal resistance of the first battery cell 231 forming the third battery cell group 230 is equal to the internal resistance of the second battery cell 232. Accordingly, right after the charging of the battery 200 is terminated, a current does not flow between the first battery cell 211 and the second battery cell 212, and between the first battery cell 231 and the second battery cell 232. Accordingly, polarization recovery is immediately caused.

However, a current loop is formed due to the potential difference between the first battery cell 221 and the second battery cell 222 forming the second battery cell group 220 and a self-balancing phenomenon in which the current flows until the potential of the first battery cell 221 is equal to the potential of the second battery cell 222. When the self-balancing phenomenon is completed (that is, a current does not flow any more), the polarization recovery is caused.

Accordingly, the polarization recovery time ($\Delta t_{N+S}$) of the second battery cell group 220 is further required, as compared to a polarization recovery time ($\Delta t_N$) of the first battery cell group 210 or the third battery cell group. Accordingly, the voltage decrement (that is, a voltage slop) of the second battery cell group 220 is smaller than the voltage decrement of the first battery cell group 210 and the third battery cell group 230. The controller 40 may detect the battery cell group having abnormality based on the difference in the voltage decrement.

Figure 3:
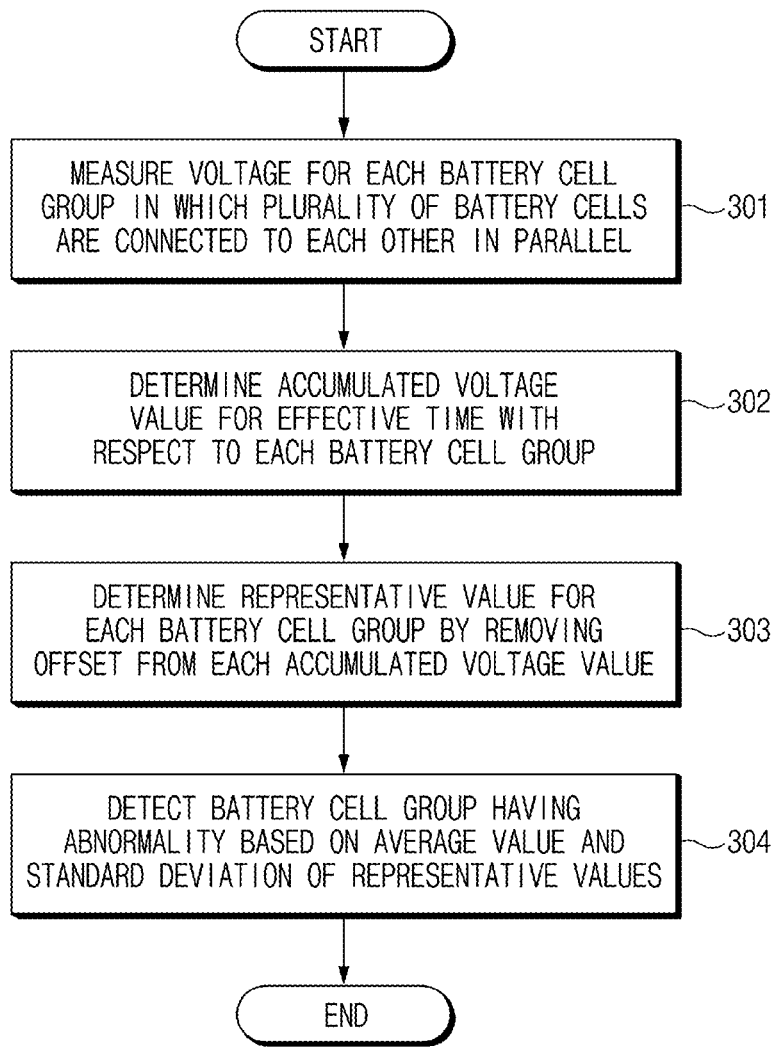
FIG. 3 is a flowchart illustrating a method for diagnosing the abnormality of a battery cell group, according to an exemplary embodiment of the present disclosure.

FIG. 3 is a flowchart illustrating a method for diagnosing the abnormality of a battery cell group according to an exemplary embodiment of the present disclosure.

The controller 40 may set conditions of commencing the diagnosis of the abnormality of the battery cell group to increase the accuracy of the diagnosis. For example, the conditions may be as follows.

First, as the intensity of a charging current is increased, the difference in the intensity of the charging current between battery cell groups is increased due to the resistance imbalance, increasing the time required for the self-balancing. Accordingly, it is preferable to commence the diagnosis of the abnormality of the battery cell group when rapid charging is performed to increase the accuracy of the diagnosis.

Second, as a charging amount of a charging current is increased, the difference in the charging amount of the charging current between battery cell groups is increased due to the resistance imbalance, increasing the time required for the self-balancing. Accordingly, it is preferable to commence the diagnosis of the abnormality of the battery cell group when the depth of discharge (DoD) of the battery 200 is at least 50% to increase the accuracy of the diagnosis.

Thereafter, the voltage sensor 20 periodically measures a voltage with respect to a battery cell group in which a plurality of battery cells are connected to each other in parallel (301). For example, the voltage sensor 20 may measure the voltage of the battery cell group in unit of 0.1 second (or 0.5 second).

Thereafter, the controller 40 may be configured to determine the accumulated voltage value for the effective time with respect to each battery cell group (302). In the instant case, the controller 40 may collect the voltage of each battery cell for one hour (hereinafter, effective time) right after charging is terminated, from three seconds right before the charging is terminated, to increase the accuracy of the diagnosis, when considering that the imbalance of the accumulated current amount is maximized right before the polarization recovery and the self-balancing are commenced. In the instant case, the controller 40 may be configured to determine the average in unit of one second to collect 3603 voltages. For example, the average of 10 voltages measured for one second may be collected as a voltage corresponding to one second.

Furthermore, the controller 40 may be configured to determine the minimum voltage value and the maximum voltage value with respect to each battery cell group from among voltage values collected for the effective time $\Delta t_w$. Furthermore, the controller 40 may exclude the maximum voltage value when accumulating voltages for the effective time, with respect to the battery cell group. Furthermore, the controller 40 may sort voltages for the effective time in descending order with respect to each battery cell group, and exclude a predetermined number of voltages in an order of including the largest value, when accumulating voltages for the effective time with respect to each battery cell group.

Thereafter, the controller 40 may be configured to determine the representative value of each battery cell group by removing an offset from each accumulated voltage value (303).

For example, the controller 40 may be configured to determine the first offset by multiplying ($\Delta t_w \times V_{min}$) the minimum voltage value ($V_{min}$) of the first battery cell group 210 by the effective time ($\Delta t_w$), and may be configured to determine the representative value of the first battery cell group 210 by subtracting the first offset from the accumulated voltage value of the first battery cell group 210. For example, the controller 40 may be configured to determine the second offset by multiplying the minimum voltage value of the second battery cell group 220 by the effective time, and may be configured to determine the representative value of the second battery cell group 210 by subtracting the second offset from the accumulated voltage value of the second battery cell group 210. For example, the controller 40 may be configured to determine the third offset by multiplying the minimum voltage value of the third battery cell group 230 by the effective time, and may be configured to determine the representative value of the third battery cell group 210 by subtracting the third offset from the accumulated voltage value of the third battery cell group 210.

Figure 4:
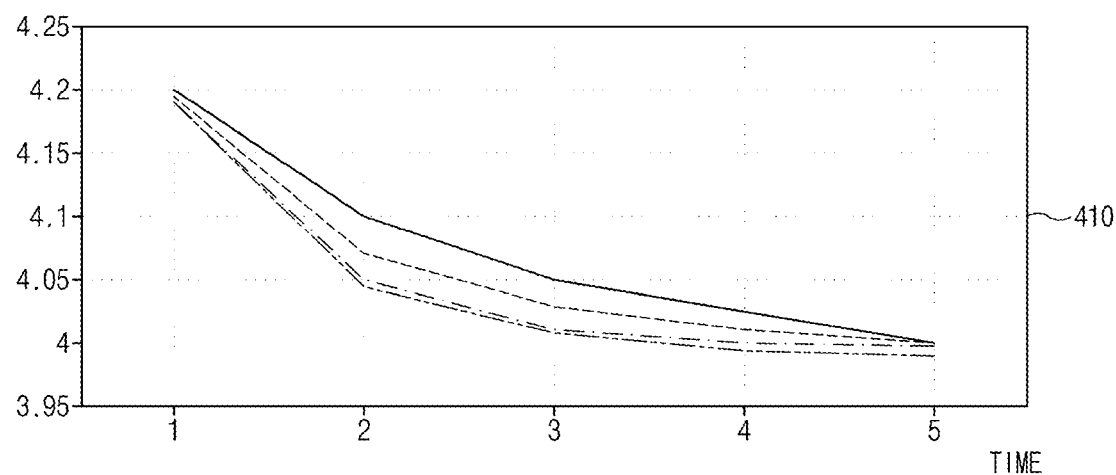
FIG. 4 is a view exemplarily illustrating a result obtained as a controller provided in an apparatus for diagnosing the abnormality of a battery cell group removes an offset value from an accumulated voltage value, according to an exemplary embodiment of the present disclosure.
Figure 4:
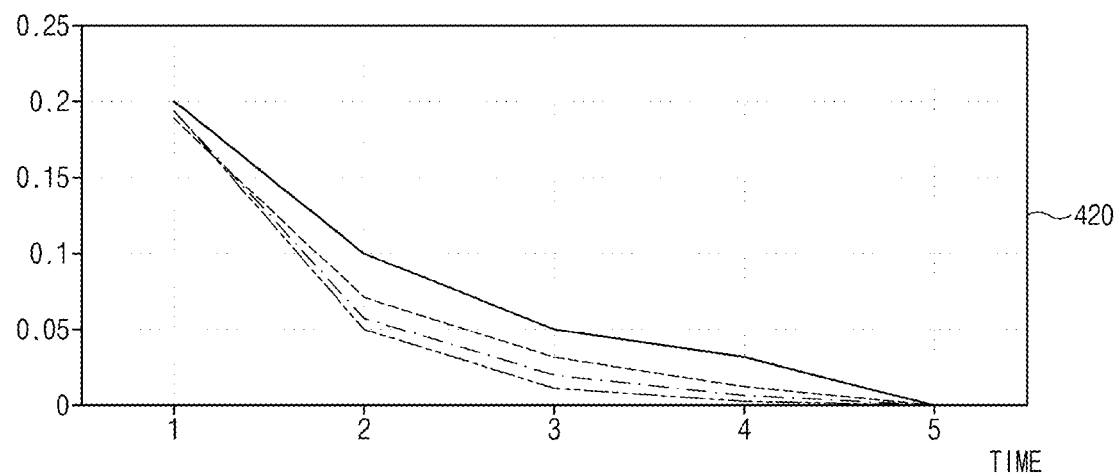

As the offset is removed from the accumulated voltage value, the voltage variation for the effective time may be extracted between a normal battery cell group and an abnormal battery cell group. When the offset is removed, a shaper standard deviation may be determined as illustrated in FIG. 4. The standard deviation is utilized as a threshold range for determining whether the battery cell group is abnormal. Accordingly, the deriving the standard deviation is a core process of determining the diagnosing performance according to an exemplary embodiment of the present disclosure.

FIG. 4 is a view exemplarily illustrating a result obtained as a controller provided in an apparatus for diagnosing the abnormality of a battery cell group removes an offset value from an accumulated voltage value according to an exemplary embodiment of the present disclosure.

In FIG. 4, reference numeral '410' indicates the case in which the offset is not removed, and reference numeral '420' indicates the case in which the offset is removed. When the offset is removed (see reference numeral 420), the average value and the variance are removed, and a sharper standard deviation may be derived as compared to when the offset is not removed (see reference numeral 410).

Thereafter, the controller 40 may detect the battery cell group having the abnormality, based on the average value and the standard deviation of the representative values (304). In other words, the controller 40 may be configured to determine the threshold range ($\mu-3\sigma \sim \mu+3\sigma$) by use of the average value ($\mu$) and the standard deviation ($\sigma$), and may detect the battery cell group corresponding to the representative value, which is out of the threshold range, from among the representative values of the battery cell group. The controller 40 may diagnose the abnormality for the maximum value of the representative value of the battery cell group. In other words, the controller 40 may be configured to determine whether the maximum value from among the representative values of each battery cell group is out of the threshold range. When the maximum value is out of the threshold range, the battery cell group corresponding to the maximum value may be diagnosed as a battery cell group having the abnormality. In the instant case, the controller 40 may count the number of times of detecting with respect to each battery cell group, and may finally diagnose the battery cell group in which the number of times of detecting exceeds the threshold number of times (for example, 10 times) as the battery cell group having the abnormality.

Meanwhile, the controller 40 may transmit the number of times of diagnosis of the abnormality for each battery cell group to the trend monitoring server 300. In the instant case, the diagnosis year, the diagnosis date, and the diagnosis time may be transmitted to the trend monitoring server 300.

Figure 5:
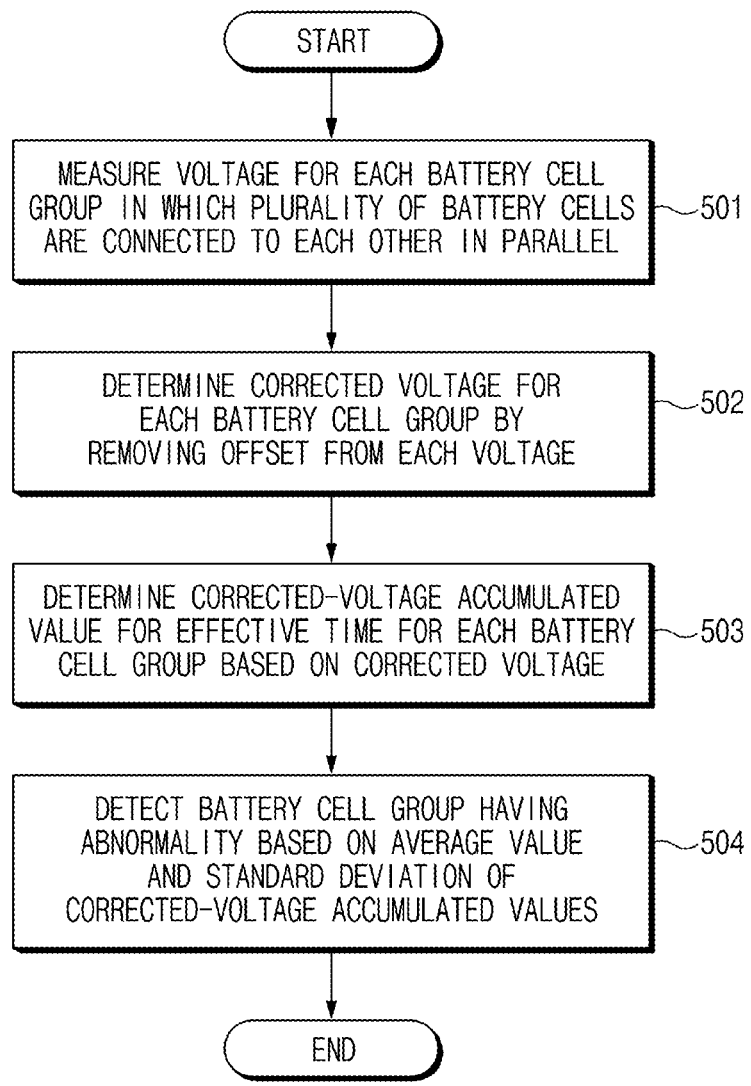
FIG. 5 is a flowchart illustrating a method for diagnosing the abnormality of a battery cell group, according to another exemplary embodiment of the present disclosure.

FIG. 5 is a flowchart illustrating a method for diagnosing the abnormality of a battery cell group according to an exemplary embodiment of the present disclosure.

The controller 40 may set conditions of commencing the diagnosis of the abnormality of the battery cell group to increase the accuracy of the diagnosis. For example, the conditions may be as follows.

First, as the intensity of a charging current is increased, the difference in the intensity of the charging current between battery cell groups is increased due to the resistance imbalance, increasing the time required for the self-balancing. Accordingly, it is preferable to commence the diagnosis of the abnormality of the battery cell group when rapid charging is performed to increase the accuracy of the diagnosis.

Second, as a charging amount of a charging current is increased, the difference in the charging amount of the charging current between battery cell groups is increased due to the resistance imbalance, increasing the time required for the self-balancing. Accordingly, it is preferable to commence the diagnosis of the abnormality of the battery cell group when the depth of discharge (DoD) of the battery 200 is at least 50% to increase the accuracy of the diagnosis.

Thereafter, the voltage sensor 20 periodically measures a voltage with respect to a battery cell group in which a plurality of battery cells are connected to each other in parallel (501). In the instant case, the controller 40 may collect the voltage of each battery cell for one hour (hereinafter, effective time) right after charging is terminated, from three seconds right before the charging is terminated to increase the accuracy of the diagnosis, when considering that the imbalance of the accumulated current amount is maximized right before the polarization recovery and the self-balancing are commenced. Furthermore, the controller 40 may be configured to determine the minimum voltage value and the maximum voltage value with respect to each battery cell group of voltage values collected for the effective time $\Delta t_w$. For example, the voltage sensor 20 may measure the voltage of the battery cell group in unit of 0.1 second (or 0.5 second). In the instant case, the controller 40 may be configured to determine the average in unit of one second to collect 3603 voltages. For example, the controller 40 may collect the average of 10 voltages measured for one second as a voltage corresponding to one second.

Thereafter, the controller 40 may be configured to determine the representative value of each battery cell group by removing an offset from each voltage (502). For example, the controller 40 may determine, as the first offset, the minimum voltage value of the voltage values of the first battery cell group 210 measured for the effective time, and may be configured to determine the corrected voltage of the first battery cell group 210 by subtracting the first offset from each voltage of the first battery cell group 210. For example, the controller 40 may determine, as the second offset, the minimum voltage value of the voltage values of the second battery cell group 220 measured for the effective time, and may be configured to determine the corrected voltage of the second battery cell group by subtracting the second offset from each voltage of the second battery cell group 220. For example, the controller 40 may determine, as the third offset, the minimum voltage value of the voltage values of the third battery cell group 230 measured for the effective time, and may be configured to determine the corrected voltage of the third battery cell group by subtracting the third offset from each voltage of the third battery cell group 230.

Thereafter, the controller 40 may be configured to determine a corrected-voltage accumulated voltage value for the effective time with respect to each battery cell group, based on the corrected voltage (503). Furthermore, the controller 40 may exclude the maximum voltage value when accumulating voltages for the effective time, with respect to the battery cell group. Furthermore, the controller 40 may sort voltages for the effective time in descending order with respect to each battery cell group, and exclude a predetermined number of voltages in an order of having the largest value, when accumulating voltages for the effective time with respect to each battery cell group.

Thereafter, the controller 40 may detect the battery cell group having the abnormality, based on the average value and the standard deviation of the representative values (504). In other words, the controller 40 may be configured to determine the threshold range ($\mu-3\sigma \sim \mu+3\sigma$) by use of the average value ($\mu$) and the standard deviation ($\sigma$), and may detect, as the battery cell group having the abnormality, the battery cell group corresponding to the corrected-voltage accumulated value, which is out of the threshold range, from among the corrected-voltage accumulated values of the battery cell group. The controller 40 may diagnose the abnormality for the maximum value of the corrected-voltage accumulated value of the battery cell group. In other words, the controller 40 may be configured to determine whether the maximum value from among the corrected-voltage accumulated values of each battery cell group is out of the threshold range. When the maximum value is out of the threshold range, the battery cell group corresponding to the maximum value may be diagnosed as a battery cell group having the abnormality. In the instant case, the controller 40 may count the number of times of detecting with respect to each battery cell group, and may finally diagnose the battery cell group in which the number of times of detecting exceeds the threshold number of times (for example, 10 times) as the battery cell group having the abnormality.

Meanwhile, the controller 40 may transmit the number of times of diagnosis of the abnormality for each battery cell group to the trend monitoring server 300. In the instant case, the diagnosis year, the diagnosis date, and the diagnosis time may be transmitted to the trend monitoring server 300.

Figure 6:
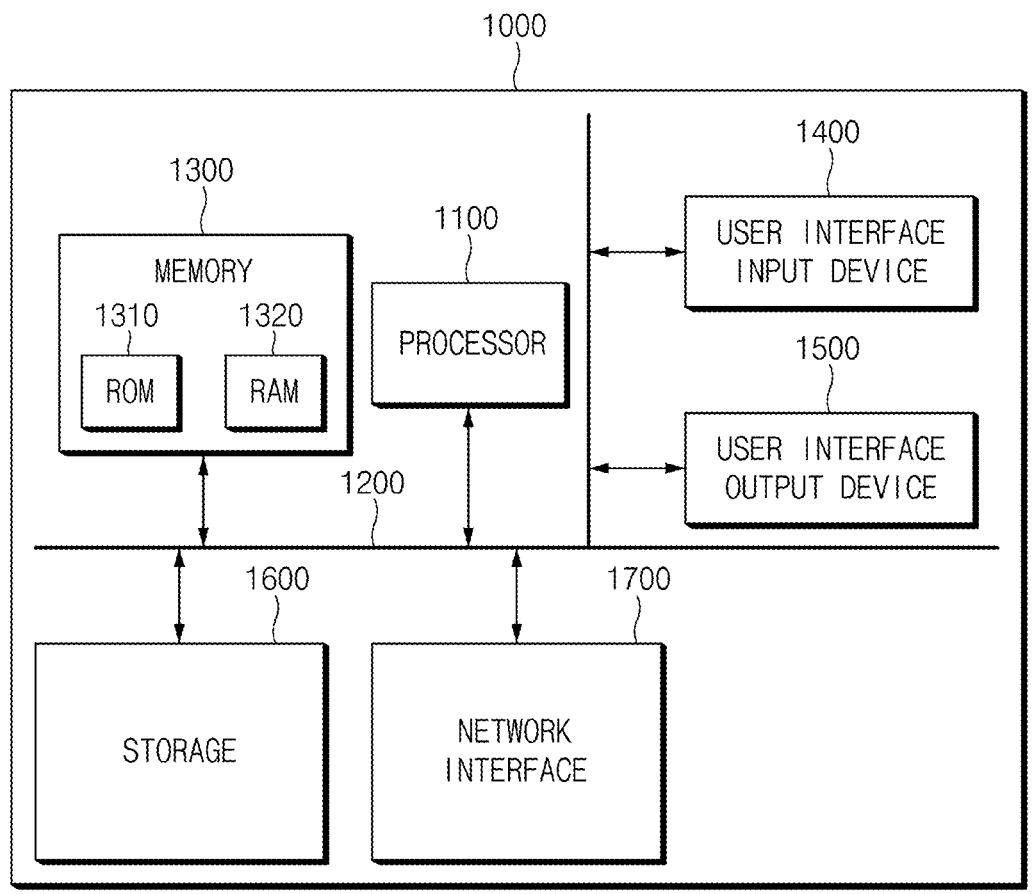
FIG. 6 is a block diagram illustrating a computing system to execute a method for diagnosing the abnormality of a battery cell group, according to an exemplary embodiment of the present disclosure.

FIG. 6 is a block diagram illustrating a computing system to execute a method for diagnosing the abnormality of a battery cell group, according to an exemplary embodiment of the present disclosure.

Referring to FIG. 6, according to an exemplary embodiment of the present disclosure, the method for diagnosing the abnormality of a battery cell group may be implemented through the computing system. The computing system 1000 may include at least one processor 1100, a memory 1300, a user interface input device 1400, a user interface output device 1500, a storage 1600, and a network interface 1700, which are connected to each other via a system bus 1200.

The processor 1100 may be a central processing unit (CPU) or a semiconductor device configured for processing instructions stored in the memory 1300 and/or the storage 1600. Each of the memory 1300 and the storage 1600 may include various types of volatile or non-volatile storage media. For example, the memory 1300 may include a read only memory (ROM; see 1310) and a random access memory (RAM; see 1320).

Thus, the operations of the methods or algorithms described in connection with the exemplary embodiments included in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor 1100 and storage medium may reside in an application specific integrated circuit (ASIC). The ASIC may reside in a user terminal. Alternatively, the processor 1100 and the storage medium may reside as separate components of the terminal of the user.

According to an exemplary embodiment of the present disclosure, the voltage may be measured with respect to each battery cell group including the plurality of battery cells connected to each other in parallel, the accumulated value (accumulated voltage value) of a voltage for an effective time in each battery cell group may be determined, the representative value for each battery cell group may be measured by removing an offset from each accumulated voltage value, and the battery cell group having abnormality, may be detected based on an average value and a standard deviation of the representative values, diagnosing the abnormality of each battery cell group with higher accuracy, with respect to battery cell groups in which a plurality of battery cells are connected to each other.

The above description is merely an example of the technical idea of the present disclosure, and various modifications and modifications may be made by one skilled in the art without departing from the essential characteristic of the present disclosure. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for diagnosing abnormality of a battery cell group, the apparatus comprising:
   a voltage sensor measuring a voltage value with respect to each battery cell group including a plurality of battery cells connected to each other in parallel; and
   a controller configured to:
      determine an accumulated voltage value for an effective time with respect to each battery cell group;
      determine a representative value for each battery cell group by removing an offset from each accumulated voltage value; and
      detect a battery cell group having the abnormality, based on an average value and a standard deviation of the representative values.

2. The apparatus of claim 1, wherein the controller is further configured to:
   determine, as the effective time, a time period before and after charging of the battery cell group is terminated.

3. The apparatus of claim 1, wherein the controller is further configured to:
   sort voltages for the effective time in descending order with respect to each battery cell group; and
   exclude a predetermined number of voltages from a highest voltage value with respect to each battery cell group.

4. The apparatus of claim 1, wherein the controller is further configured to:
   determine an offset for each battery cell group by multiplying a minimum voltage value for each battery cell group by the effective time; and
   subtract the offset from the accumulated voltage value for each battery cell group.

5. The apparatus of claim 1, wherein the controller is further configured to:
   determine a threshold range by use of the average value and the standard deviation; and
   diagnose, as the battery cell group having the abnormality, a battery cell group corresponding to a representative value, which is out of the threshold range, from among representative values of each battery cell group.

6. A method for diagnosing abnormality of a battery cell group, the method comprising:
   measuring, by a voltage sensor, a voltage value with respect to each battery cell group including a plurality of battery cells connected to each other in parallel;
   determining, by a controller, an accumulated voltage value for an effective time with respect to each battery cell group;
   determining, by the controller, a representative value for each battery cell group by removing an offset from each accumulated voltage value; and
   detecting, by the controller, a battery cell group having the abnormality, based on an average value and a standard deviation of representative values.

7. The method of claim 6, wherein the determining of the accumulated voltage value includes:
   determining, by the controller, as the effective time, a time period before and after charging of the battery cell group is terminated.

8. The method of claim 6, wherein the determining of the accumulated voltage value includes:
   sorting, by the controller, voltages for the effective time in descending order with respect to each battery cell group; and
   excluding, by the controller, a preset number of voltages from a highest voltage value with respect to each battery cell group.

9. The method of claim 6, wherein the determining of the representative value for each battery cell group includes:
   determining, by the controller, an offset for each battery cell group by multiplying a minimum voltage value for each battery cell group by the effective time; and
   subtracting, by the controller, the offset from the accumulated voltage value for each battery cell group.

10. The method of claim 6, wherein the detecting of the battery cell group having the abnormality includes:
  determining, by the controller, a threshold range by use of the average value and the standard deviation; and
  diagnosing, by the controller, as the battery cell group having the abnormality, a battery cell group corresponding to a representative value, which is out of the threshold range, from among representative values of each battery cell group.

11. An apparatus for diagnosing abnormality of a battery cell group, the apparatus comprising:
  a voltage sensor configured for measuring a voltage value with respect to each battery cell group including a plurality of battery cells connected to each other in parallel; and
  a controller configured to:
    determine a corrected voltage for each battery cell group by removing an offset from the voltage value;
    determine a corrected-voltage accumulated value for an effective time with respect to each battery cell group, based on the corrected voltage; and
    detect a battery cell group having the abnormality, based on an average value and a standard deviation of the corrected-voltage accumulated value.

12. The apparatus of claim 11, wherein the controller is further configured to:
  determine, as an offset for each battery cell group, a minimum voltage value for the battery cell group from among voltage values for each battery cell group measured for the effective time; and
  subtract the offset from voltage values for each battery cell group.

13. The apparatus of claim 11, wherein the controller is further configured to:
  determine, as the effective time, a time period before and after charging of the battery cell group is terminated.

14. The apparatus of claim 11, wherein the controller is further configured to:
  sort voltages for the effective time in descending order with respect to each battery cell group; and
  exclude a preset number of voltages from a highest voltage value with respect to each battery cell group.

15. The apparatus of claim 11, wherein the controller is further configured to:
  determine a threshold range by use of the average value and the standard deviation; and
  diagnose, as the battery cell group having the abnormality, a battery cell group corresponding to a corrected-voltage accumulated value, which is out of the threshold range, from among corrected-voltage accumulated values of each battery cell group.

16. A method for diagnosing abnormality of a battery cell group, the method comprising:
  measuring, by a voltage sensor, a voltage value with respect to each battery cell group including a plurality of battery cells connected to each other in parallel;
  determining, by a controller, a corrected voltage for each battery cell group by removing an offset from the voltage value;
  determining, by the controller, a corrected-voltage accumulated value for an effective time with respect to each battery cell group, based on the corrected voltage; and
  detecting, by the controller, a battery cell group having the abnormality, based on an average value and a standard deviation of the corrected-voltage accumulated value.

17. The method of claim 16, wherein the determining of the corrected voltage for each battery cell group includes:
  determining, by the controller, as an offset for each battery cell group, a minimum voltage value for the battery cell group from among voltage values for each battery cell group measured for the effective time; and
  subtracting, by the controller, the offset from voltages for each battery cell group.

18. The method of claim 16, wherein the determining of the accumulated voltage value includes:
  determining, by the controller, as the effective time, a time period before and after charging of the battery cell group is terminated.

19. The method of claim 16, wherein the determining of the accumulated voltage value includes:
  sorting, by the controller, voltages for the effective time in descending order with respect to each battery cell group; and
  excluding, by the controller, a predetermined number of voltages from a highest voltage value with respect to each battery cell group.

20. The method of claim 16, wherein the detecting of the battery cell group having the abnormality includes:
  determining, by the controller, a threshold range by use of the average value and the standard deviation; and
  diagnosing, by the controller, as the battery cell group having the abnormality, a battery cell group corresponding to a corrected-voltage accumulated value, which is out of the threshold range, from among corrected-voltage accumulated values of each battery cell group.

* * * * *